United States Patent [19]

Borello

[11] 4,104,548

[45] Aug. 1, 1978

[54] ELECTRIC MOTOR FOR GENERAL PURPOSES (II)

[76] Inventor: Domenic Borello, 142 Nyack Ave., Pelham, N.Y. 10803

[21] Appl. No.: 742,421

[22] Filed: Nov. 17, 1976

Related U.S. Application Data

[62] Division of Ser. No. 640,974, Dec. 15, 1975, Pat. No. 4,020,370.

[51] Int. Cl.² .................................... H02K 41/00
[52] U.S. Cl. .................................... 310/14; 310/46
[58] Field of Search .................. 310/14, 24, 23, 34, 310/35, 46, 75 R

[56] References Cited

U.S. PATENT DOCUMENTS

| | | | |
|---|---|---|---|
| 464,063 | 12/1891 | Collom | 310/14 |
| 517,858 | 4/1894 | Greenfield | 310/14 |
| 741,325 | 10/1903 | Gibbs | 310/46 X |
| 748,182 | 12/1903 | Hachmann | 310/46 X |
| 1,132,445 | 3/1915 | Conrad | 310/14 |

*Primary Examiner*—Donovan F. Duggan
*Attorney, Agent, or Firm*—Bauer, Amer & King

[57] ABSTRACT

Underlying the present invention is the recognition that a conventional electric motor, which has its rotor move only in passing relation to the stator magnetic field-producing coils, is the significant source of inefficiency delaying the development of an effective use of electrical energy. That is said conventional electric motor's ineffective use of the motive power available from the electrical source, rather than any nominal extent thereof, is what primarily restricts the efficient use of existing electric motors and contributes to unpredictable electrical consumption, short circuits when in a stalled position, loss of directional power when starting with a load that causes a counter-rotation, inability to readily change speed and horsepower output, excessive costs of repair, inefficiencies caused by back EMF and other current losses which may amount to 20% of applied current, poor magnetic design, and other such problems, all of which are solved or obviated by the within improved electric motor. Thus, the within invention, which is directed to effective use of electric energy is therefore concerned with an improved electric motor which, as a substitute for the conventional operative arrangement of rotor and field coils as noted above, instead has the rotor urged through movement centrally of, rather than merely past, the field coils, thus obtaining maximum prime mover drive for any electrically powered motor.

1 Claim, 16 Drawing Figures

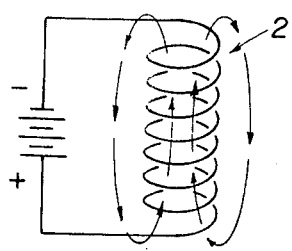
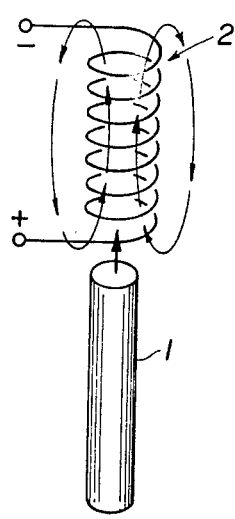
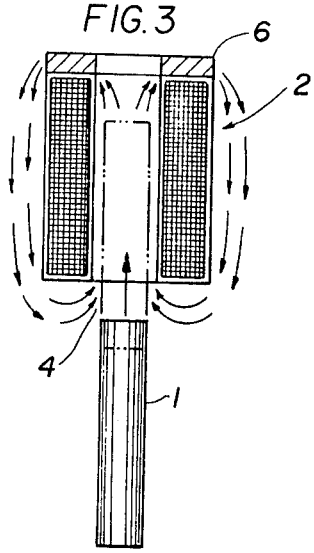
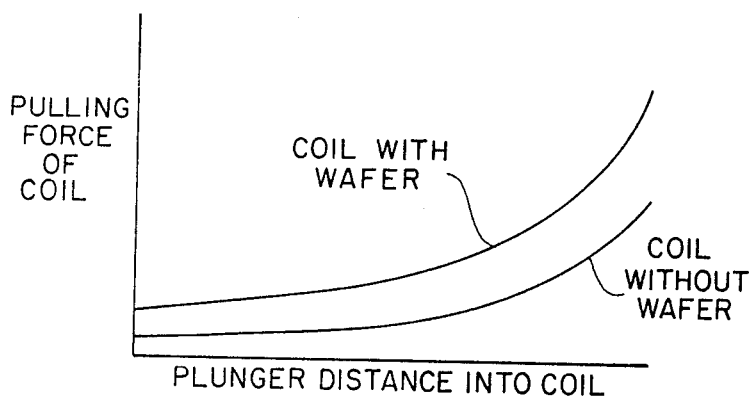
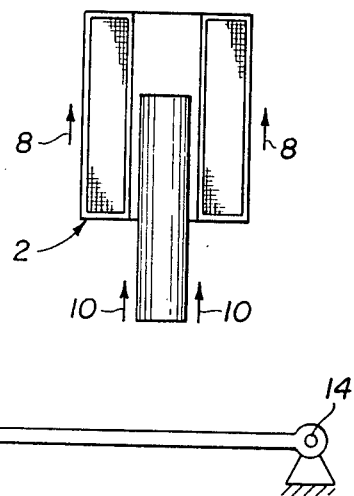

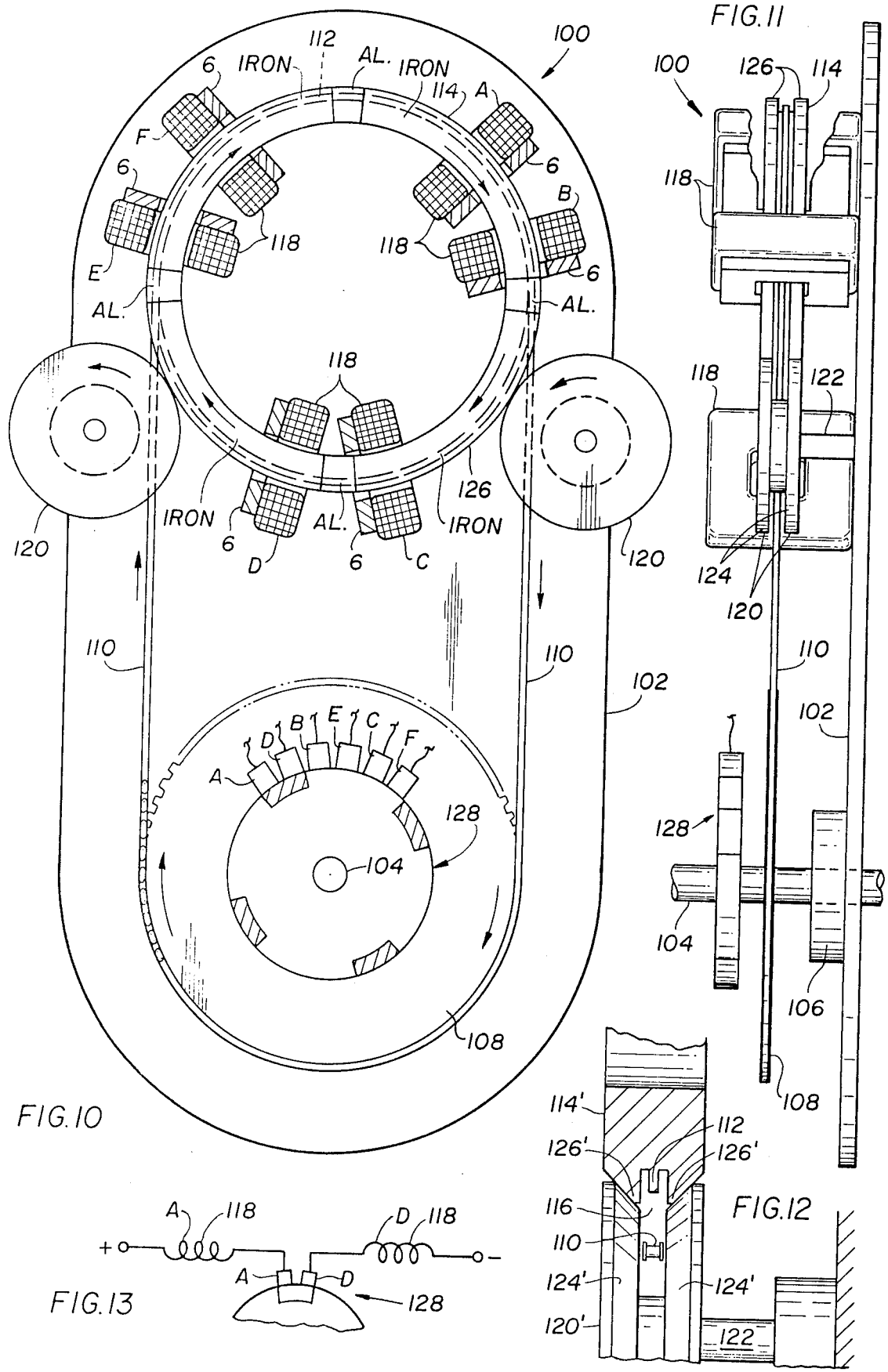

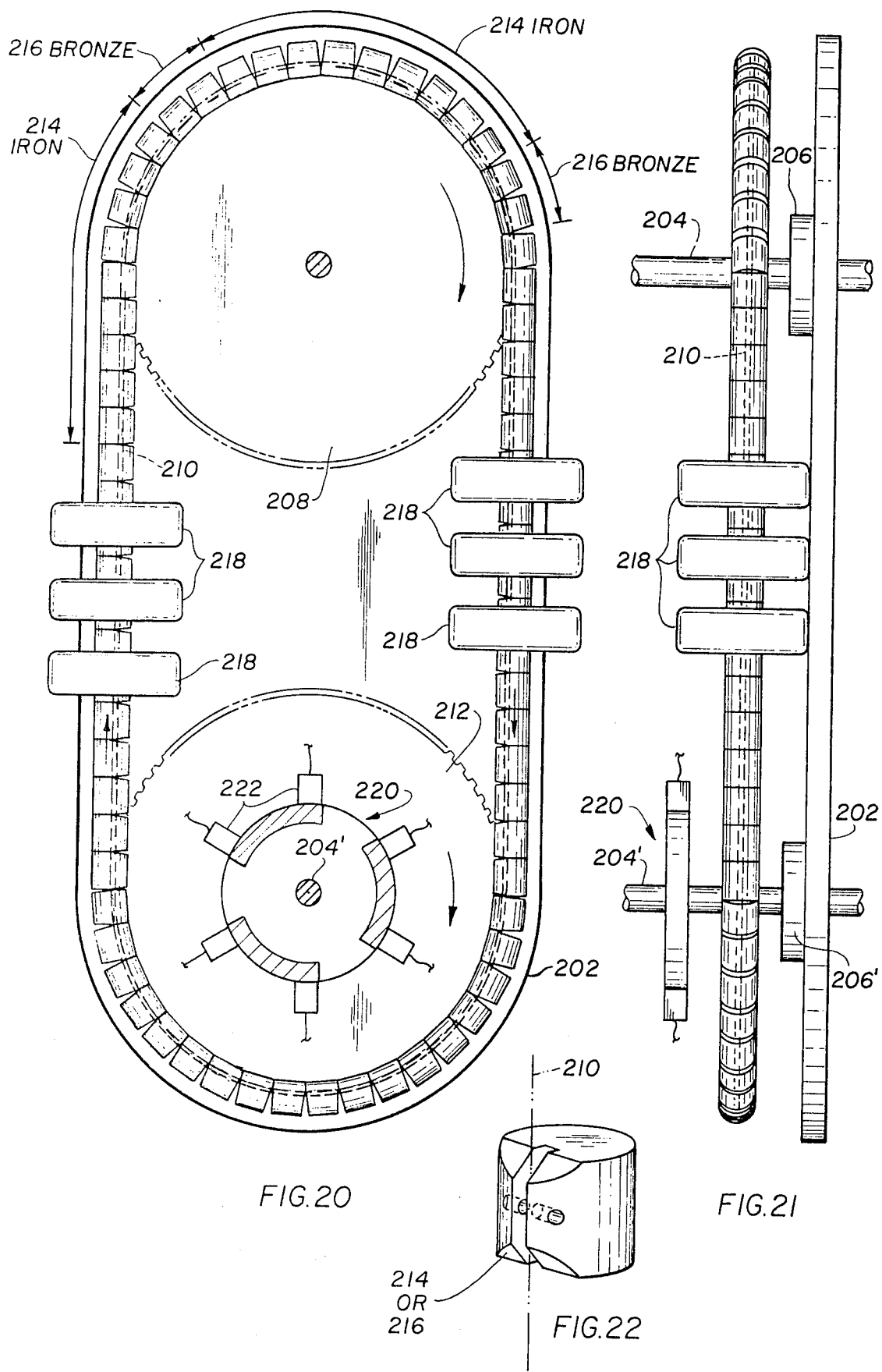

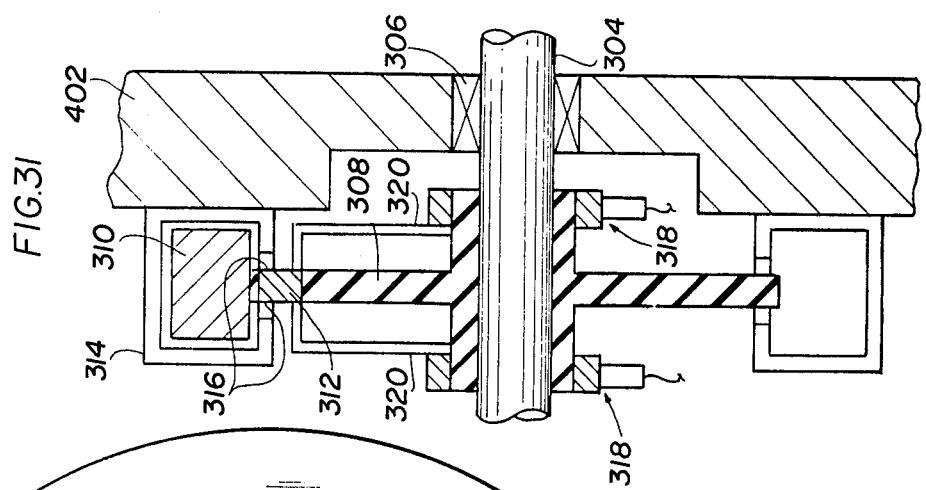
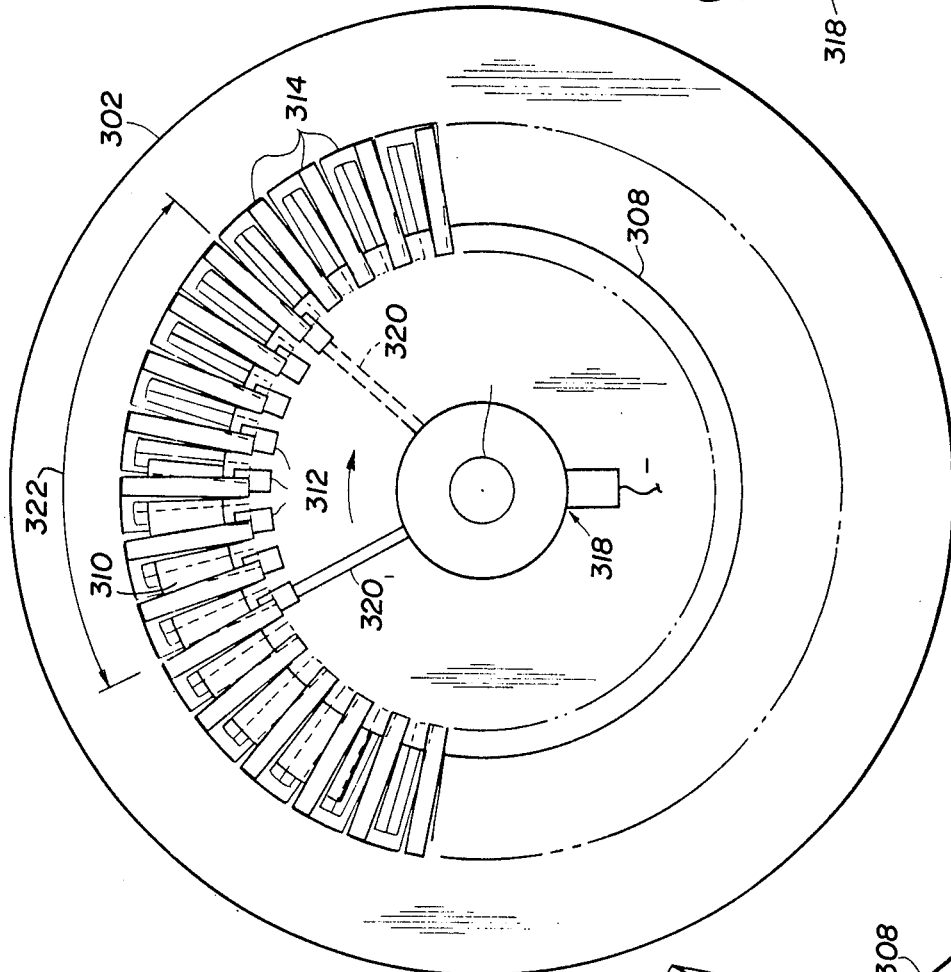
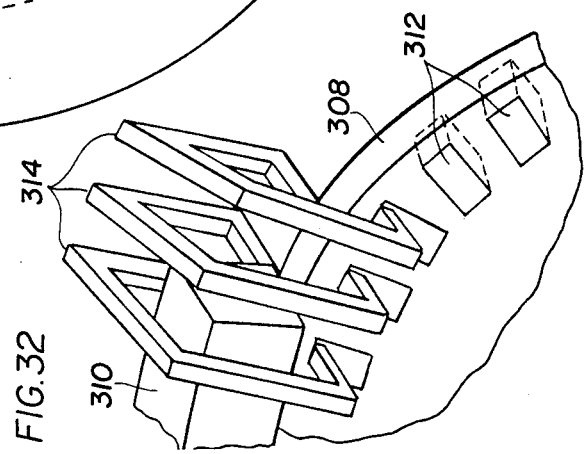

ELECTRIC MOTOR FOR GENERAL PURPOSES (II)

This application is a division of U.S. Application Ser. No. 640,974, filed Dec. 15, 1975, entitled "An Improved Electric Motor For General Purposes" now U.S. Pat. No. 4,020,370.

The present invention relates generally to improvements for an electric motor, the improvements, more particularly, residing in a more effective electric prime mover or motor.

As generally understood, a conventional electric motor utilizes an induced magnetic field to cause driving rotation of its magnetizable rotor. Thus, in a sense, a conventional electric motor is a magnet-type device in that its motive power output is a function of the effectiveness with which the induced magnetic field pulls the rotor through the power stroke of the operating cycle of the motor. In connection with the above, underlying the present invention is the recognition that a conventional motor, because of its mode of operation, is, in actual fact, a poorly functioning, and inefficient magnet. Among other shortcomings, the magnetic field and the rotor or armature of a conventional motor are operatively arranged in an offset or non-aligned relation, i.e. the field producing coils are located adjacent the rotary path of the rotor which, when magnetically attracted by said field, moves merely past, but not through the field. Heretofore, this operative arrangement of these components, achieving only an indirect, rather than a direct or aligned magnetic pulling relationship, was an acceptable alternative to reconstructing the motor to obviate this inherent shortcoming. Also, power-line or utility-supplied electricity to operate conventional electric motors has heretofore been plentiful and sufficiently economical to tolerate the inefficiency noted. The circumstances now, however, have changed radically. The fuel supply has severely diminished and the cost has become prohibitive.

To enhance an understanding of the improved electric motor hereof, and more particularly the various models or embodiments thereof, it is helpful to refer to a somewhat analogous situation. Specifically, the construction and mode of operation of a solenoid is, of course, well understood. It has particularly been recognized that the dissipation of comparatively little electrical energy, i.e. by the flowing of relatively small amperage current through the solenoid coil to generate the magnetic field thereof, a strong mechanical force or power stroke is achieved during the magnetic pull of the solenoid plunger towards the coil. In the contemplated operation of the within improved electric motor embodiments, this efficient solenoid-type relationship between the magnet components of the motor is used in place of the usual operating relationship of these components now used in conventional electric motors.

Broadly, it is an object of the present invention to provide a practical and effective electric motor overcoming the foregoing and other shortcomings of the prior art. Specifically, it is an object to provide an improved electric motor in which the field and rotor type components are in a direct solenoid-type alignment, thereby maximizing the motive drive output for the available electric energy.

The motor embodiments demonstrating objects and advantages of the present invention all include plural magnetic field generating coils, each having a central opening strategically located not merely adjacent, but directly on the contemplated rotary path of the rotor or magnetizable plunger of the motor. That is, said noted positional location of each coil as regards the generally cylindrically shaped plunger provides an operational arrangement in which each coil is in surrounding relationship to said plunger or to the contemplated rotary path of same.

The above brief description, as well as further objects, features, and advantages of the present invention will be more fully appreciated by reference to the following detailed description of presently preferred, but nonetheless illustrative embodiments in accordance with the present invention, when taken in conjunction with the accompanying drawings, wherein:

FIGS. 1–6 illustrate general principles embodied in the three embodiments of the inventive electric motor hereof of main drawing FIGS. 10, 20 and 30, and drawing figures ancillary thereto. More particularly, FIG. 1 illustrates a coil-created magnetic field;

FIG. 2 illustrates the effect of said field of FIG. 1 on an iron bar or plunger;

FIG. 3 illustrates how the magnetic field of FIGS. 1, 2 is enhanced by an additional pole piece or so-called wafer or keeper;

FIG. 4 is a graph demonstrating the comparative magnetic forces of the fields of FIGS. 2 and 3;

FIG. 5 illustrates the plunger movement caused by said coil-created magnetic field; and FIG. 6 illustrates how said plunger movement of FIG. 5 is directed along a rotary path to, in turn, provide a rotary motor drive.

FIG. 10 is a front elevational view of a first embodiment;

FIG. 11 is a side elevational view projected from FIG. 10;

FIG. 12 is a detail view, partially in section, of an alternate ring support idler wheel; and FIG. 13 is a wiring diagram.

FIG. 20 is a front elevational view of a second embodiment;

FIG. 21 is a side elevational view projected from FIG. 20; and

FIG. 22 is a detail view of a link used either as a plunger or separator.

FIG. 30 is a front elevational view of a third embodiment;

FIG. 31 is an approximate cross-section on vertical center line; and

FIG. 32 is a partial perspective view of the novel features of this embodiment.

GENERAL

In contrast to a conventional electric motor, in the operation of which a rotor rotates in passing relation to a surrounding magnetic field-creating stator, the motor embodiments hereof utilize rotors, or plungers, that actually move into and through, rather than merely past, the magnetic field. What, in essence, is therefore involved is the fundamental operating concept of a solenoid, in the known and well understood operation of which a DC current made to pass through a coil creates a magnetic field 2, as illustrated in FIG. 1.

If an iron bar or plunger 1 is adjacent a magnetic field or coil 2 it will be pulled into the coil. Because of the permeability of the construction materials of the coil 2, the magnetic field concentrates therein, as at 4, and the magnetic force on the plunger increases. For a given current and coil, the magnetic pull can be further concentrated by adding an iron pole piece, wafer or keeper, designated 6 in FIG. 3, thus increasing the magnetic force on the plunger 1. The results of the above combinations are demonstrated in the graph of FIG. 4.

If the current is allowed to flow and the plunger 1 to advance, a point of equilibrium will be reached. That is, the plunger 1 will stay at an equilibrium point within the stationary coil 2. If, however, the coil 2 is advanced as fast as the plunger travels, then the plunger will continue to follow, as indicated by the movements 8, 10 in FIG. 5.

Also, as illustrated in FIG. 6, if the plunger 1 can be arranged to follow a rotary path, a rotary motor drive 14 is established.

It is the purpose of this invention to apply the above principles to three basic drive methods, each respectively shown in main FIGS. 10, 20, and 30, and in the drawing figures ancillary thereto.

First Embodiment of FIG. 10

This motor embodiment, generally designated 100, includes a supporting chassis plate 102 on which drive shaft 104 is mounted in one or more bearings 106. Secured to drive shaft 104 is output sprocket 108 which is driven by chain 110. Chain 110 is driven by input sprocket 112 which is integral with plunger ring 114. Plunger ring 114 is a segmented iron ring which is interrupted by short non-magnetic pieces. As shown in FIG. 10, ring 114 is divided in quarters having almost 80% of iron, and 10% of aluminum. As best shown in FIG. 11, input sprocket 112 is built in annular groove 116 machined about the entire circumference of plunger ring 114.

Surrounding the plunger ring 114 is an array of electromagnetic coils, individually and collectively designated 118, and also marked A-F to differentiate one from the other. FIG. 10 shows six such coils, each mounted on chassis 102. It is to be understood, however, that many combinations of coils 118 and plunger ring segments may be used and provide the efficacy contemplated by the present invention.

Since plunger ring 114 rotates through the center openings of coils 118, it is necessary to support the ring at its peripheral edge rather than on a center bearing.

Support wheels 120 mounted on axles 122 have a pair of flanges 124 which bear against a corresponding pair of flanges 126 on plunger ring or wheel 114. Flanges 126 straddle groove 116. Torque forces developed during operation of the chain 110 are also withstood by support wheels 120.

Commutator 128 supplies DC current to the coils 118 in a desired sequence so that they interact with iron segments of plunger ring 114 and power the ring in rotation, thus driving chain 110. Rotary switch 128 is comprised of conventional brushes and contact segments.

An advantageous feature of the rotary switch or commutator 128, as shown in FIG. 10, is the ability to connect two or more coils 118 in series through the bar on the commutator so that the required current flow through these multiple coils for an effective field can be diminished, as this in turn results in being able to use a smaller conductor or wire size, FIG. 13 shows the connection of coil A and D in series. In the series connection just noted, current is introduced through coil A on the plus side of the line. The other side of the same coil is then connected to a brush and then travels from the brush to the commutator bar, through to coil D, through this coil and out through the minus side of the line, thereby dampening the current at the brushes and commutator bars. The commutator of FIG. 10 in practice also allows current to flow in sequence through interconnected coils A and D, B and E, and C and F, with four cycles for each output revolution. As generally understood, the geometry of the coils, the number of plunger segments, and the specific mode of sequencing of the commutator can be altered for the particular performance required of the motor 100.

Power is supplied from an electrical source (not shown) to commutator 128. Select coils 118 are activated and deactivated to cause, in a well understood manner, a driving influence on the iron segments of plunger ring 114. Mechanical power or rotation is transmitted to output shaft 104 via input sprocket 112, chain 110, and output sprocket 108.

As a mechanical equivalent to that already described, FIG. 12 shows a support wheel 120' mounted on axle 122, having chamfered flanges 124' abutting chamfered flanges 126' on plunger wheel 114'. This configuration offers a greater degree of stability to the plunger ring, and also may be advantageously used in the second motor embodiment hereof.

In this and other embodiments it may be necessary to water cool the electromagnetic coils. This coolant, after heat transfer, can be advantageously used for conventional heating in a vehicle or otherwise. In this and other embodiments, it is also advisable to arrange for suitable motor housings to reduce wind resistance, entanglements with foreign bodies, and to improve its appearance of aesthetics to exactly resemble conventional motors. Also, coils 118 may have multiple taps to accommodate various voltages; and reserve voltage supplies may be made available to assist in overcoming short duration overloads. Mechanically, flywheels and mechanical balancing can be used to advantage, where appropriate.

Second Embodiment of FIG. 20

A second motor embodiment hereof, generally designated 200, as clearly shown in FIG. 20 is mounted on a chassis plate 202, on which drive shaft 204 is supported in one or more bearings 206. Secured to drive shaft 204 is output sprocket 208 which is driven by chain 210 entrained, at its opposite end, about idler sprocket 212. Idler shaft 204' provided for the sprocket 212 may also be used as a power take off shaft.

Pinned or otherwise connected to drive chain 210 are plunger links 214 made of iron, and also separator links 216 made of non-magnetic material. These links as shown in FIG. 20, are proportioned in a ratio of 9 to 2, but another suitable ratio may also be used, as long as it is compatible with the diameter size of the sprockets 208, 212 and with the electromagnetic coils 218. In this last respect, coils 218, which function as the solenoid-type electromagnets for motor 200, are mounted on chassis plate 202, as clearly shown in FIG. 21.

A commutator 220 operates in a well known manner to supply power to coils 218 through slip rings (not shown). Brushes 222 optionally may include the series connecting feature mentioned previously in connection with FIG. 13. The commutator 220 will be understood to connect coils 218 in a sequence providing maximum efficiency, in accordance with established procedures.

In operation, the iron links 214 align themselves as a straight bar on chain 210, and as they pass through the coils 218 magnetic coupling will lock this alignment of links in place and thus interfere with their movement in a rotary path. Thus, the iron links 214 are strategically separated by the non-magnetic links 216 and thus are better able to make the turn around the sprockets. As the links or plungers 214 pass through the coils 218, chain 219 made up of the links 214 drives sprockets 208 and 212, and in turn drives the shaft 204, and also shaft 204', which also may be utilized as a power take-off or output shaft.

Third Embodiment of FIG. 30

The next motor embodiment hereof, generally designated 300, uses an advancing field and following plunger, the same having a solenoid-type interrelationship or orientation. Motor 300, as shown in FIGS. 30-32, includes a base plate 302 supporting a main shaft 304 journalled for rotation in at least one bearing 306.

Mounted on shaft 304 is a rotor 308. Rotor 308 supports at least one plunger 310. Also mounted on rotor 308 is an array of insulated connecting links 312, the significance of which will now be explained. If a loop of conductor has a small segment removed from its perimeter, it would properly be called "C" shaped, and would no longer be continuous. If the segment that was removed were to be put back in place, however, the loop would then be continuous. The latter, in effect, is a "replaced" piece with a cooperating one of the connecting links 312. More particularly, this motor embodiment contemplates the use of a series of loops 314 mounted on base plate 302. As perhaps best illustrated in FIG. 31, a small part of the lower leg of each loop has been cut away, as at 316. The connecting link 312 on inner rotor 308, as shown in FIG. 32, thus takes the place of the cutout 316. In practice, suitable brushes will be used at the contact points or surfaces, at which each partial loop 314 and link 312 contact each other in making a loop complete. Upon study of FIG. 30, it will be noted that an offset is provided as between each loop and its cooperating connecting link 312. As a consequence of this slight offset, the series of loops 314 form a continuous spiral coil.

Also mounted on rotor 308 are a pair of slip rings and brushes 318 which supply voltage to a selected pair of connecting links 312 via conductors 320. As clearly shown in FIG. 30, conductor 320+ is embodied in rotor 308 in advance of conductor 320− by an angular span 322 which covers approximately eight loops 314. Since electrical contact is established for the included loops 314 between conductors 320+ and 320−, via the connecting links 312, a solenoid is in effect formed, and the applied voltage results in a magnetic force which pulls plunger 310 in a clockwise direction. As this rotation takes place, the loop 314 in front of conductor 320+ now becomes the first loop in the spiral, while the last loop 314 is disengaged by the clockwise movement of conductor 320−, or more particularly, by the clockwise movement of link 312 of conductor 320− from its position spanning and thus completing said "last loop 314". As clearly illustrated, plunger 310 is connected to rotate in unison with rotor 308 and is urged through said rotation by virtue of the magnetic coil being continuously formed in advanced relation to it by said cooperating loops 314 and links or contacts 312.

The improved electric motor, in its three various designs as described herein, has application in both consumer and industrial end uses. Additionally, by virtue of its energy saving characteristics, it is uniquely suitable for powering an electric vehicle.

With regard to powering an electric vehicle, the within motor, by virtue of utilizing a rotor which moves directly through, rather than merely past, the magnetic field, as is the case with a conventional motor, has the capability of functioning, and does function, as a more effective prime mover for an electric vehicle which must carry its own energy source in the form of batteries or the like. Stated another way, a conventional motor, operated in a conventional way by electricity supplied by utility companies over power lines or the like to the point of use, has an inherent inefficiency attributable to the way the field and rotor are oriented, but this inefficiency has been tolerated because the power line electricity has heretofore been plentiful and economical. This conventional, "inherently inefficient" motor is now, however, being pressed into use as a prime mover for a battery-operated vehicle, and in this end use, the noted inefficiency significantly diminishes the operating range of the vehicle, requires a larger battery pack, more frequent recharging of the batteries, and has other serious shortcomings. Thus, the electric motor for a car or vehicle, as embodied in the three designs as heretofore described, which dispenses with the conventional orientation or relationship of stator and rotor for the solenoid-type relationship as described herein, represents a significant and noteworthy advance in this technology.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In an electric motor of the type including at least one coil having a central opening and electrically connected to generate a magnetic field, and a magnetizable body carried at the periphery of a rotor adapted to be powered in rotation by said field, the improvements comprising said coil of said magnetic field being in the specific form of individual helical turns disposed in a circumferential arrangement with said central opening in each said helical turn located along the contemplated rotary path of said rotor magnetizable body, each said helical turn having a segment missing therefrom in an area thereof coincident with said rotary path of said rotor magnetizable body, means supporting said rotor in an operative relation to said magnetic field coil such that said central openings of said helical turns occupy a position in surrounding relation to said contemplated rotary path of said magnetizable body of said rotor, and a select number of electrically conductive segments disposed in circumferential relation to each other in said rotor in advanced relation to said magnetizable body thereof, said conductive segments being disposed in locations effective to electrically complete corresponding helical turns with which said conductive segments establish contact, whereby said helical turns in said completed condition are effective when energized to generate a magnetic field powering said rotor in rotation.

* * * * *